Figure 1:
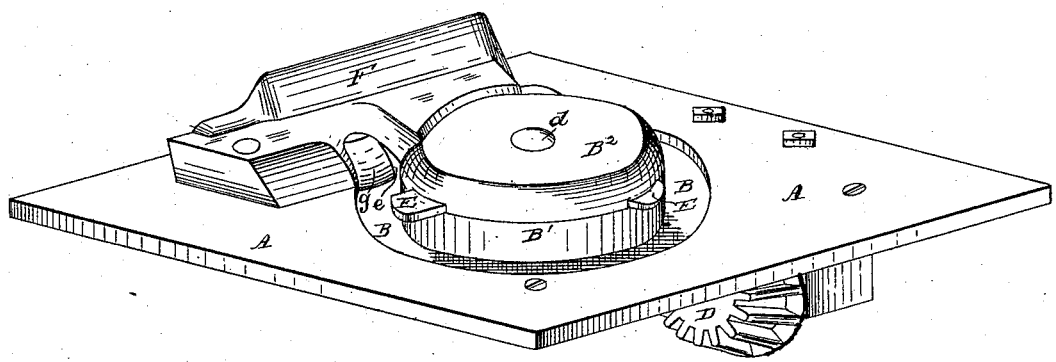

(No Model.) 3 Sheets—Sheet 1.
A. B. FARQUHAR, H. W. EISENHART & B. M. ROOT.
FERTILIZER DISTRIBUTER.

No. 345,580. Patented July 13, 1886.

Witnesses:
E. B. Smith
E. L. Dick

Inventors:
Arthur B. Farquhar
Henry W. Eisenhart
Benjamin M. Root
by Marcellus Bailey atty (No Model.) 3 Sheets—Sheet 2.
A. B. FARQUHAR, H. W. EISENHART & B. M. ROOT.
FERTILIZER DISTRIBUTER.

No. 345,580. Patented July 13, 1886.

(No Model.) 3 Sheets—Sheet 3.
A. B. FARQUHAR, H. W. EISENHART & B. M. ROOT.
FERTILIZER DISTRIBUTER.
No. 345,580. Patented July 13, 1886.
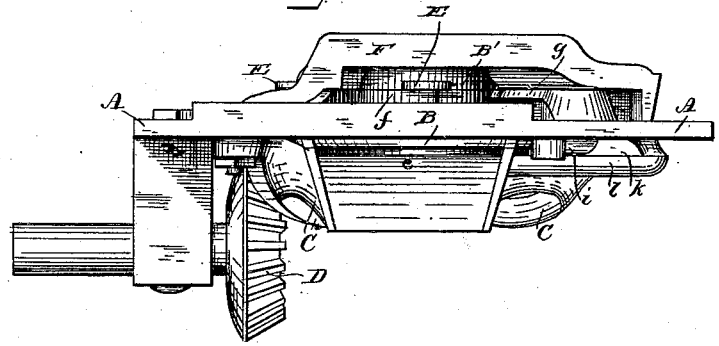
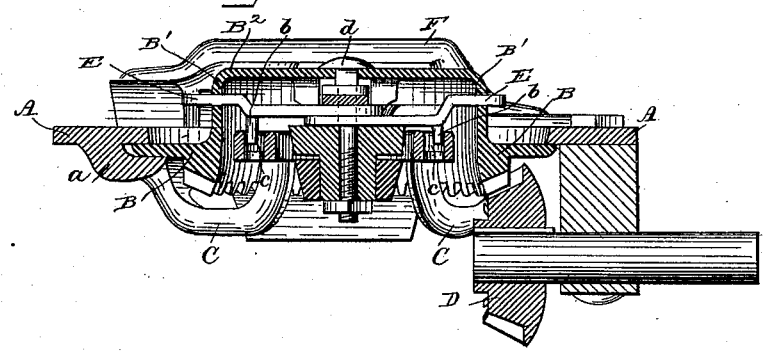

UNITED STATES PATENT OFFICE.

ARTHUR B. FARQUHAR, HENRY W. EISENHART, AND BENJAMIN M. ROOT, OF YORK, PENNSYLVANIA, ASSIGNORS TO SAID ARTHUR B. FARQUHAR.

FERTILIZER-DISTRIBUTER.

SPECIFICATION forming part of Letters Patent No. 345,580, dated July 13, 1886.

Application filed May 5, 1886. Serial No. 201,160. (No model.)

*To all whom it may concern:*

Be it known that we, ARTHUR B. FARQUHAR, HENRY W. EISENHART, and BENJAMIN M. ROOT, all of York, in the county of York and State of Pennsylvania, have invented certain new and useful Improvements in Fertilizer-Distributers, of which the following is a specification.

In the device which we have invented the feed wheel or disk, like the feed-wheel in several grain or fertilizer sowers or distributers, is placed beneath an opening in the bottom plate of the attachment, and is there held in place on its edge and at its center by a spider furnishing a bearing for its hub, and by an annular flange or one or more lugs bordering the opening in the plate and supporting the feed-disk at or near its periphery.

Under our invention the feed-disk on its inner face carries a hub from which project laterally several plungers to stir the material and carry it along to a lateral discharge-opening beneath a cap, which, as usual, covers a portion of the wheel or its hub at that point in such manner as to exclude all but a determinate quantity of the fertilizer from passing to the feed-opening, into or toward which said material is deflected by a cut-off or flange suitably placed for the purpose. The discharge throat or passage is widened or contracted, so as to regulate the feed, by means of a gate of peculiar construction, which we find simple of construction, easy of application, and very efficient. This gate is a pivoted one, consisting of a hub which fits in a circular bearing hole or opening in the bottom plate, and is held in place between the cap on one side and the spider on the other, and a cam-like leaf or projection extending laterally from the hub and forming a gate by which the gradual contraction of the throat or passage may be obtained in the direction of the end which opens into the discharge-opening. The plungers, in addition to rotating with the feed disk or wheel for the purpose of stirring the material, can be made to move in and out of the hub during their movement of rotation, thus stripping themselves of the fertilizer that may accumulate on and stick to them; and to this end they may be mounted in radial ways in the hub of the feed-wheel, and be provided on their tails or inner ends with flanges or lugs to enter an eccentric or cam groove formed in the adjoining face of the spider, whereby the plungers by and during the revolution of the wheel will be caused to alternately protrude from and retire into the hub. In this way the plungers will clear themselves, although we prefer also to bring the sharp front edge of the cap down close over the plungers in substantially the same way and for the same purpose that a similar arrangement is employed in connection with a rotary toothed disk in Letters Patent No. 256,430, of April 11, 1883.

The nature of our improvements will be readily understood by reference to the accompanying drawings, in which—

Figure 2:
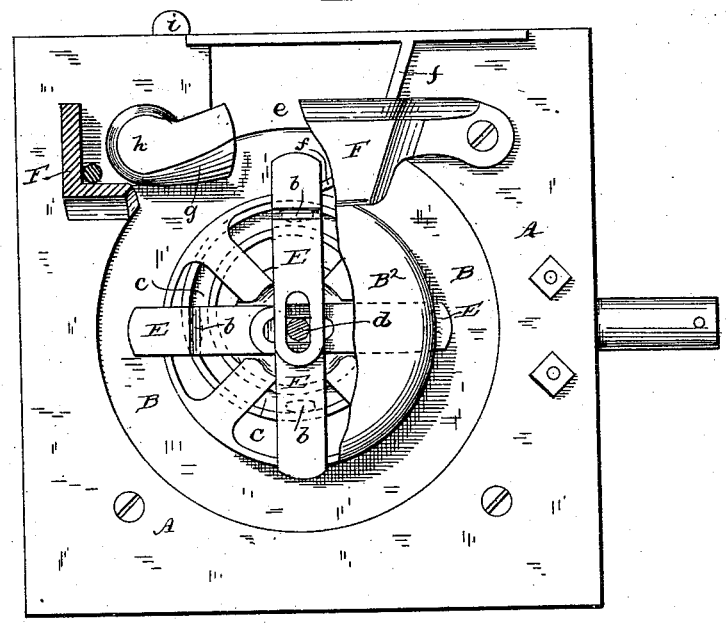
Figure 3:
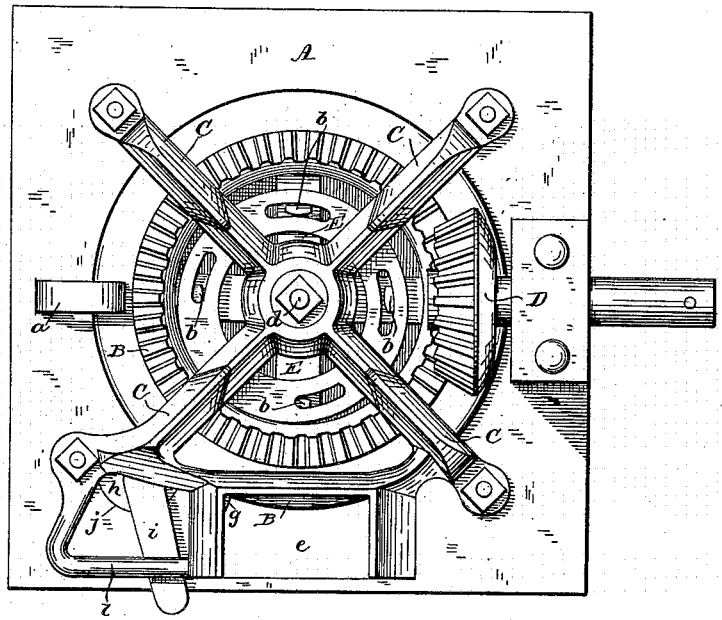
Figure 4:
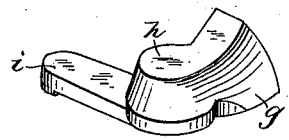

Figure 1 is a perspective view of the device. Fig. 2 is a top plan, and Fig. 3 is a bottom plan, of the same. In Fig. 2 portions of the cap and of the head or cover of the hub are broken away to expose to view the parts beneath. Fig. 4 is a view of the gate detached. Fig. 5 is an elevation on the side on which the discharge-opening is located. Fig. 6 is a cross-section on the line 6 6, Fig. 1.

The bottom plate or bed-plate is shown at A. B is the feed wheel or disk, arranged beneath the opening in the bed-plate, and supported in place in the customary way by the spider C, which furnishes a central bearing for the journal of the wheel, and by one or more lugs or flanges, $a$, which border the opening in the bed-plate and form a supporting guideway for the disk at its edge or periphery. The disk on its under side is provided with the usual beveled cogs for engaging the driving-pinion D. Upon the upper face of the disk, projecting up through the central opening in the bed-plate, is the central hub, B', which receives plungers E. These plungers project radially from the sides of the hub, and, as before said, they may, if desired, be made to move in and out during the revolution of their supporting-hub. One convenient arrangement for the purpose is shown in the drawings. The plungers slide in radial guideways in the hub, and on their inner ends are provided with lugs $b$, which fit in an eccentric or cam groove, $c$, in the adjoining face of the spider. Whenever the plungers are made movable, they should project the extreme distance as they approach the entrance to the feed throat or passage, and the cam or eccentric groove $c$ (shown in the drawings) is so located as to effect this result. The plungers can be readily got at by removing the head or cover $B^2$ of the hub, which is held to the body of the hub by a bolt, $d$, and the external openings, through which the plungers play, are in this instance bounded on top and sides by the said cover, the upper end of the body of the hub forming the bottom of said openings, so that when the cover is removed the plungers will be quite free to be removed or replaced.

F is the cap which covers the discharge-opening $e$ and the throat or passage leading to the same, the sharp front edge of said cap being formed and shaped to extend across the entrance to said passage just above the plungers, so that it will coact with them, substantially in the manner and for the purposes hereinbefore indicated. The cap is formed or provided internally with a deflecting-flange or cut-off plate, $f$, which extends from the periphery of the hub $B'$ to the discharge-opening $e$, and forms one wall of the throat or passage through which the material is directed to the discharge-opening. The other wall of this passage is formed by the wing or cam-like plate $g$ of the gate for regulating the feed. This gate is preferably a single casting consisting of the hub $h$, the wing or cam-like extension $g$, and the handle $i$. In the bed-plate is formed a circular opening, $j$, in which the hub $h$ fits and rotates, said opening communicating with the large feed wheel opening in the plate, so as to permit the gate-wing $g$ to work in close proximity to the feed wheel or disk. The hub at one end bears against the inner face of the cap F, and at the other end it is held in place by being overlapped by the disk B, and by having its arm or handle received in a slot or guideway, $k$, on the under side of the bed-plate, said guideway being formed in the present instance by the bed-plate and a parallel rail, $l$, on the spider, between which two parts the arm or handle projects. In this simple way the gate is pivoted or swiveled in position to enlarge or contract the feed-throat, as may be desired, the wing $g$ forming one side of that throat and acting to contract it gradually toward its inner end.

We are aware that feed-wheels have been supported beneath their bed-plates by spiders alone, or by spiders and peripheral lugs or flanges in conjunction. We are also aware that it is not new, broadly considered, to provide a feed-wheel with plungers, which are operated to move out and in during the rotation of the feed-wheel. We are also aware that feed-wheels for grain, fertilizers, &c., have been provided with stirrers or with teeth and combined with deflecting plates or flanges for directing the material from the wheel to the discharge opening or outlet. We are also aware that gates have been used to control the feed-outlet. We claim none of these things.

What we do claim herein as new, and of our invention, is as follows:

1. The pivoted gate $g\,h\,i$, in combination with the bed-plate, the cap, and the spider or other part forming, with the bed-plate, a guideway for the handle $i$, substantially as and for the purposes set forth.

2. The bed-plate, feed-disk B, hub $B'$, and plungers E, in combination with the cap F, the pivoted gate, and the deflecting-flange $f$, arranged together for joint operation as hereinbefore shown and described.

3. The combination, with the feed-wheel, the bed-plate, and the cap F, of the deflecting-flange $f$ and the pivoted gate $g\,h\,i$, forming, with flange $f$, the side walls of the throat or passage leading to the discharge-outlet, substantially as set forth.

4. The combination of the bed-plate, the cap F, the deflecting-flange $f$, the pivoted gate, the feed-disk and hub, and the laterally-projecting plungers supported in guideways in said hub, and arranged and operated, substantially as described, to alternately protrude from and draw back into the hub, as and for the purposes hereinbefore set forth.

In testimony whereof we have hereunto set our hands this 28th day of April, 1886.

ARTHUR B. FARQUHAR.
HENRY W. EISENHART.
BENJAMIN M. ROOT.

Witnesses:
F. W. ZEIGLER,
ALBERT M. EBERLY.